US008638876B2

(12) United States Patent
Huang et al.

(10) Patent No.: US 8,638,876 B2
(45) Date of Patent: Jan. 28, 2014

(54) SYSTEMS AND METHODS FOR PROVIDING PREAMBLE CODES AND GENERATING PREAMBLE SIGNALS IN WIRELESS COMMUNICATIONS

(75) Inventors: Chao-Wang Huang, Daya Township (TW); Cheng-Ming Chen, Hsinchu (TW); Pang-An Ting, Fengyuan (TW); Jen-Yuan Hsu, Jincheng Township (TW); Yu-Tao Hsieh, Hsinchu (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 422 days.

(21) Appl. No.: 12/976,696

(22) Filed: Dec. 22, 2010

(65) Prior Publication Data

US 2011/0158330 A1 Jun. 30, 2011

Related U.S. Application Data

(60) Provisional application No. 61/290,878, filed on Dec. 29, 2009, provisional application No. 61/380,883, filed on Sep. 8, 2010.

(51) Int. Cl.
*H04L 27/00* (2006.01)

(52) U.S. Cl.
USPC .......................................... 375/295; 375/260

(58) Field of Classification Search
USPC ................... 375/260, 295, 284; 370/210, 329
See application file for complete search history.

(56) References Cited

U.S. PATENT DOCUMENTS

| 7,403,570 | B2 | 7/2008 | Ma et al. | |
|---|---|---|---|---|
| 7,778,338 | B2 | 8/2010 | Ma et al. | |
| 2004/0204108 | A1* | 10/2004 | Etkin et al. | 455/562.1 |
| 2008/0043613 | A1 | 2/2008 | Yang et al. | |
| 2008/0285500 | A1* | 11/2008 | Zhang et al. | 370/315 |
| 2009/0046582 | A1* | 2/2009 | Sarkar et al. | 370/230.1 |
| 2010/0272043 | A1* | 10/2010 | Cho et al. | 370/329 |
| 2010/0321237 | A1* | 12/2010 | Na et al. | 342/373 |
| 2011/0013720 | A1* | 1/2011 | Lee et al. | 375/295 |
| 2011/0051667 | A1* | 3/2011 | Park et al. | 370/328 |

FOREIGN PATENT DOCUMENTS

TW 201025896 7/2010

OTHER PUBLICATIONS

Zafer Sahinoglu and Sinan Gezici,"Ranging in the IEEE 802.15.4a Standard", Mitsubishi Electric Research Laboratories, IEEE, 2006.*
Chen, Cheng-Ming, et al., "Cross-Layer Design of Ranging Code Expansion in OFDMA BWA Network," Personal Indoor and Mobile Radio Communications (PIMRC), 2010 IEEE 21$^{st}$ International Symposium, Sep. 26-30, 2010, pp. 1254-1259.

* cited by examiner

*Primary Examiner* — Aristocratis Fotakis
(74) *Attorney, Agent, or Firm* — Finnegan, Henderson, Farabow, Garrett & Dunner, LLP

(57) ABSTRACT

A method for a user terminal to generate a preamble signal in a wireless communication system, the method including: generating an orthogonal sequence as a first sequence; performing cyclic shift on an antipodal version of the orthogonal sequence to generate a second sequence; and combining the first sequence and the second sequence to generate the preamble signal.

4 Claims, 14 Drawing Sheets ly efficient and high mobility is desirable for future wireless communications. Promising techniques to achieve this goal include an orthogonal frequency-division multiplexing (OFDM) technique and a multiple-input and multiple-output (MIMO) technique.

SYSTEMS AND METHODS FOR PROVIDING PREAMBLE CODES AND GENERATING PREAMBLE SIGNALS IN WIRELESS COMMUNICATIONS

RELATED APPLICATIONS

This application is based upon and claims the benefit of priority from U.S. Provisional Patent Application Nos. 61/290,878, filed Dec. 29, 2009, and 61/380,883, filed on Sep. 8, 2010, the entire contents of which are incorporated herein by reference.

TECHNICAL FIELD

This disclosure relates to systems and methods for providing preamble codes and generating preamble signals in wireless communications.

BACKGROUND

Wideband transmission with high spectral efficiency and high mobility is desirable for future wireless communications. Promising techniques to achieve this goal include an orthogonal frequency-division multiplexing (OFDM) technique and a multiple-input and multiple-output (MIMO) technique.

Traditionally, the OFDM technique uses a plurality of closely-spaced orthogonal subcarriers to carry data. The data may be allocated on a plurality of parallel subchannels, one for each of the subcarriers. Each of the subcarriers may be modulated with a conventional modulation scheme, e.g., quadrature amplitude modulation, at a relatively low symbol rate. In addition, an inverse fast Fourier transform (IFFT) may be performed on OFDM symbols representing the data on a transmitter side, e.g., at a base station, and a fast Fourier transform (FFT) may be performed to recover the OFDM symbols on a receiver side, e.g., at a user terminal. In addition, the OFDM technique may be used together with the MIMO technique, which uses multiple antennas at both the base station and the user terminal, to improve system performance.

Traditionally, a preamble signal including a preamble code may be used for timing synchronization of signals transmitted between a base station and a user terminal. For example, during a ranging process in which a timing offset between the base station and the user terminal is to be estimated, the base station may provide a plurality of ranging preamble codes (RPCs). The user terminal may randomly select one of the RPCs to generate a ranging preamble signal and transmit the ranging preamble signal to the base station. The base station may then estimate a timing offset between the base station and the user terminal, by estimating a signal round-trip delay (RTD) between the base station and the user terminal. The signal RTD is a time difference between a first time when the base station broadcasts the message and a second time when the base station receives the ranging preamble signal from the user terminal.

For example, based on the IEEE 802.16m standard, the base station may provide an RPC using a Zadoff-Chu sequence, as follows:

$$x_p(k) = \exp\left\{-j \cdot \pi \cdot \frac{r_p \cdot k \cdot (k+1) + 2 \cdot k \cdot s_p \cdot N_{CS}}{N_{RP}}\right\}, \quad \text{equation (1)}$$

$$k = 0, 1, \ldots, N_{RP} - 1,$$

where:
$x_p(k)$ is the Zadoff-Chu sequence;
$N_{RP}$ is a length of the Zadoff-Chu sequence and has a value predetermined by the base station;
p is an index of the Zadoff-Chu sequence and has a plurality of values predetermined by the base station;
$r_p$ is a root parameter of the Zadoff-Chu sequence and has a plurality of values predetermined by the base station;
$s_p$ is an index of each subcode of the Zadoff-Chu sequence and indicates an $S_p^{th}$ cyclic shift version of the Zadoff-Chu sequence, and also has a plurality of values predetermined by the base station; and
$N_{cs}$ is a cyclic shift parameter of the Zadoff-Chu sequence and has a value predetermined by the base station.

In equation (1), the item $r_p \cdot k \cdot (k+1)$ is also known as a root sequence part, and the item $2 \cdot k \cdot s_p \cdot N_{cs}$ is also known as a cyclic shift part. Different values of the root parameter $r_p$ may generate different RPCs. For a given value of the root parameter $r_p$, different values of the index $s_p$ may further generate subcodes for an RPC.

Traditionally, the base station may provide a plurality of RPCs by, e.g., broadcasting a message including the predetermined values of those parameters in equation (1), and the user terminal may randomly select one of the RPCs by selecting from the broadcasted message a value for each of those parameters and generating an RPC based on equation (1).

Based on the IEEE 802.16m standard, the user terminal may further generate a ranging preamble signal as follows:

$$S(t) = Re\left\{e^{j2\pi f_c t} \sum_{k=-(N_{RP}-1)/2}^{(N_{PR}-1)/2} x_p(k + (N_{RP}-1)/2) \cdot \right. \quad \text{equation (2)}$$

$$\left. e^{j2\pi(k+K_{offset})\Delta f_{RP}(t-T_{RCP})}\right\},$$

where:
S(t) is the generated preamble signal;
t is an elapse time since the beginning of a current ranging process;
$f_c$ is a carrier frequency;
$K_{offset}$ is a parameter relating to a frequency position;
$\Delta f_{RP}$ is a ranging subcarrier spacing; and
$T_{RCP}$ is a duration of ranging cyclic prefix.

In reality, the base station provides a limited number of RPCs. When the base station simultaneously performs ranging with a plurality of user terminals, the provided RPCs may not be sufficient for each user terminal to select a different RPC, which may cause collision in the estimation of RTDs by the base station for the user terminals. Specifically, a size of the cell covered by the base station, communication channel conditions, and mobility of the user terminals may affect accuracy of the estimation of RTDs. As a result, system performance may be degraded.

For example, for the base station to cover a larger cell, a longer symbol duration is desirable. However, for a longer symbol duration, channel variations in time may introduce signal interference that decreases subchannel orthogonality, known as inter-carrier interference (ICI). The ICI may become severe as mobility of the user terminals, the carrier frequency, or the symbol duration increase, which may cause inaccuracy in the estimation of RTDs and therefore degrade system performance.

FIG. 1 shows a power delay profile (PDP) 100 obtained by a traditional base station covering a large cell during a ranging process. Due to the cell having a large size, the base station provides RPCs without applying cyclic shift, i.e., the cyclic shift part in equation (1) has a fixed value such as zero. When a first user terminal relatively close to the base station and a second user terminal relatively far away from the base station select a same RPC by selecting a same value for the root parameter to perform ranging, the base station may detect ranging preamble signals 102 and 104 from the first and second user terminals, respectively. However, because the ranging preamble signals 102 and 104 include the same RPC, the base station may not differentiate which ranging preamble signal is transmitted from which user terminal. As a result, a collision event occurs.

FIG. 2 shows a PDP 200 obtained by a traditional base station communicating with a first user terminal moving at a high speed and a second user terminal moving at a low speed during a ranging process. When the first user terminal and the second user terminal select different subcodes, e.g., Subcode 1 and Subcode 2, of a same RPC to perform ranging, the base station may detect ranging preamble signals 202 and 204 from the first and second user terminals, respectively. However, due to Doppler effects, the base station may also detect ICIs 212 and 214 of the ranging preamble signal 202 in time periods corresponding to Subcode 0 and Subcode 2 of the RPC, respectively. As a result, the base station may not differentiate which of the ranging preamble signal 204 and the ICI 214 is transmitted from the second user terminal, and a collision event occurs. In addition, the base station may interpret the ICI 212 detected in the time period corresponding to Subcode 0 as a ranging preamble signal from a third user terminal. As a result, a false alarm event occurs.

SUMMARY

According to a first aspect of the present disclosure, there is provided a method for a user terminal to generate a preamble signal in a wireless communication system, comprising: generating an orthogonal sequence as a first sequence; performing cyclic shift on an antipodal version of the orthogonal sequence to generate a second sequence; and combining the first sequence and the second sequence to generate the preamble signal.

According to a second aspect of the present disclosure, there is provided a method for a user terminal to generate a preamble signal in a wireless communication system, comprising: generating an orthogonal sequence as a first sequence and an antipodal version of the orthogonal sequence as a second sequence; performing cross concatenation of the first sequence and the second sequence to generate a combined sequence; and performing an inverse fast Fourier transform (IFFT) or an inverse discrete Fourier transform (IDFT) on the combined sequence to generate the preamble signal.

According to a third aspect of the present disclosure, there is provided a user terminal to generate a preamble signal in a wireless communication system, comprising: a processor, the processor being configured to: generate an orthogonal sequence as a first sequence; perform cyclic shift on an antipodal version of the orthogonal sequence to generate a second sequence; and combine the first sequence and the second sequence to generate the preamble signal.

According to a fourth aspect of the present disclosure, there is provided a method for a base station to provide a set of ranging preamble codes, with one code being provided to each of a plurality of user terminals in a wireless communication system, comprising: providing the set of ranging preamble codes in first and second subsets, the first subset being for user terminals that each have an estimated signal round-trip delay (RTD) smaller than a predetermined RTD value, and the second subset being for user terminals that each have an estimated RTD not smaller than the predetermined RTD value.

According to a fifth aspect of the present disclosure, there is provided a base station to provide a set of ranging preamble codes, with one code being provided to each of a plurality of user terminals in a wireless communication system, comprising: a processor, the processor being configured to provide the set of ranging preamble codes in first and second subsets, the first subset being for user terminals that each have an estimated signal round-trip delay (RTD) smaller than a predetermined RTD value, and the second subset being for user terminals that each have an estimated RTD not smaller than the predetermined RTD value.

According to a sixth aspect of the present disclosure, there is provided a method for a base station to provide a set of ranging preamble codes, with one code being provided to each of a plurality of user terminals in a wireless communication system, comprising: providing the set of ranging preamble codes in first and second groups, the first group being for user terminals that each have a power relating to Doppler effects larger than a predetermined threshold, and the second group being for user terminals that each have a power relating to Doppler effects not larger than the predetermined threshold.

According to a seventh aspect of the present disclosure, there is provided a base station to provide a set of ranging preamble codes, with one code being provided to each of a plurality of user terminals in a wireless communication system, comprising: a processor, the processor being configured to provide the set of ranging preamble codes in first and second groups, the first group being for user terminals that each have a power relating to Doppler effects larger than a predetermined threshold, and the second group being for user terminals that each have a power relating to Doppler effects not larger than the predetermined threshold.

According to an eighth aspect of the present disclosure, there is provided a method for a user terminal to generate a ranging preamble signal to be transmitted to a base station in a wireless communication system, comprising: estimating a power relating to Doppler effects; receiving, from the base station, a predetermined threshold and a set of ranging preamble codes including first and second groups; determining if the estimated power is larger than the predetermined threshold; selecting, if it is determined that the estimated power is larger than the predetermined threshold, a ranging preamble code from the first group to generate the ranging preamble signal; and selecting, if it is determined that the estimated power is not larger than the predetermined threshold, a ranging preamble code from the second group to generate the ranging preamble signal.

According to a ninth aspect of the present disclosure, there is provided a user terminal to generate a ranging preamble signal to be transmitted to a base station in a communication system, comprising: a processor, the processor being configured to: estimate a power relating to Doppler effects; receive, from the base station, a predetermined threshold and a set of ranging preamble codes including first and second groups; determine if the estimated power is larger than the predetermined threshold; select, if it is determined that the estimated power is larger than the predetermined threshold, a ranging preamble code from the first group to generate the ranging preamble signal; and select, if it is determined that the estimated power is not larger than the predetermined threshold, a ranging preamble code from the second group to generate the ranging preamble signal.

According to a tenth aspect of the present disclosure, there is provided a method for a user terminal to transmit a ranging preamble code to a base station, the base station configured to use a beamforming technique to detect ranging preamble codes transmitted on a first resource, and to use a non-beamforming technique to detect ranging preamble codes transmitted on a second resource, the method comprising: estimating a plurality of channel quality indicators (CQIs); determining if a first one of the CQIs is significantly greater than other ones of the CQIs; randomly selecting a ranging preamble code from a set of ranging preamble codes; transmitting, if it is determined that the first one of the CQIs is significantly greater than the other ones of the CQIs, the selected ranging preamble code on the first resource; and transmitting, if it is determined that the first one of the CQIs is not significantly greater than the other ones of the CQIs, the selected ranging preamble code on the second resource.

According to an eleventh aspect of the present disclosure, there is provided a user terminal to transmit a ranging preamble code to a base station, the base station configured to use a beamforming technique to detect ranging preamble codes transmitted on a first resource, and to use a non-beamforming technique to detect ranging preamble codes transmitted on a second resource, the user terminal comprising: a processor, the processor being configured to: estimate a plurality of channel quality indicators (CQIs); determine if a first one of the CQIs is significantly greater than other ones of the CQIs; randomly select a ranging preamble code from a set of ranging preamble codes; transmit, if it is determined that the first one of the CQIs is significantly greater than the other ones of the CQIs, the selected ranging preamble code on the first resource; and transmit, if it is determined that the first one of the CQIs is not significantly greater than the other ones of the CQIs, the selected ranging preamble code on the second resource.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems and methods consistent with aspects related to the invention as recited in the appended claims.

Figure 1:
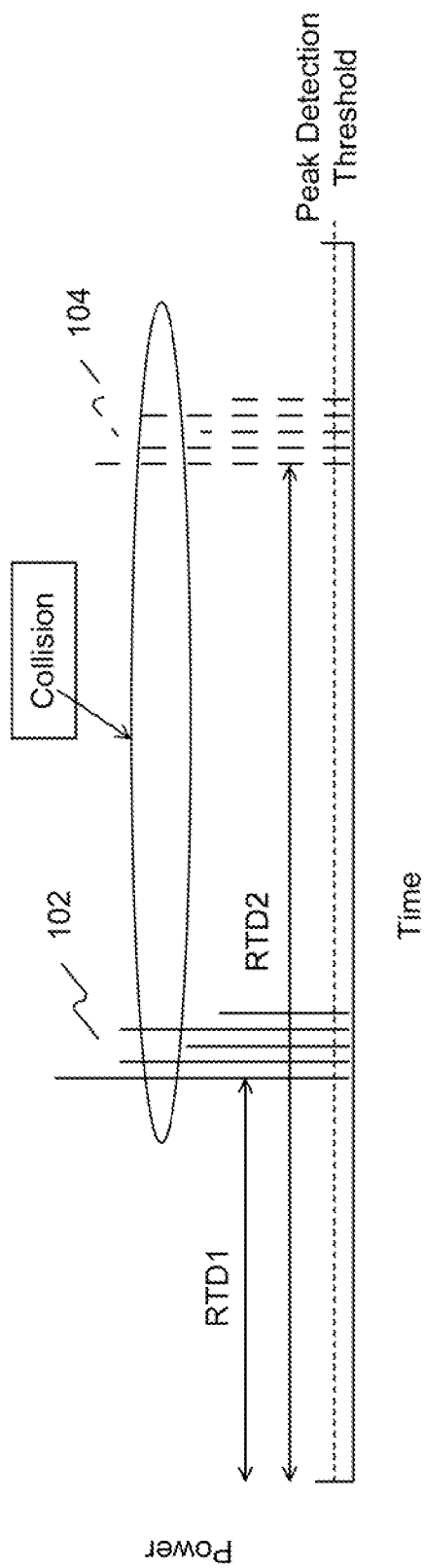
FIG. 1 shows a power delay profile obtained by a traditional base station covering a large cell during a ranging process.
Figure 2:
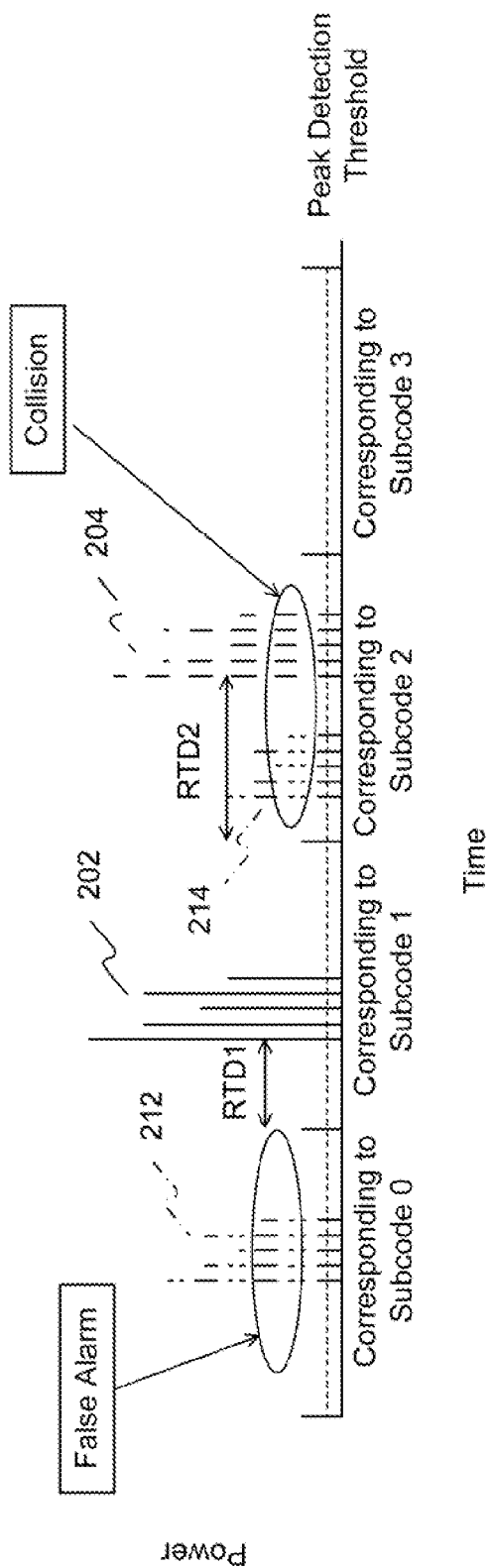
FIG. 2 shows a power delay profile obtained by a traditional base station communicating with a first user terminal moving at a high speed and a second user terminal moving at a low speed during a ranging process.
Figure 3:
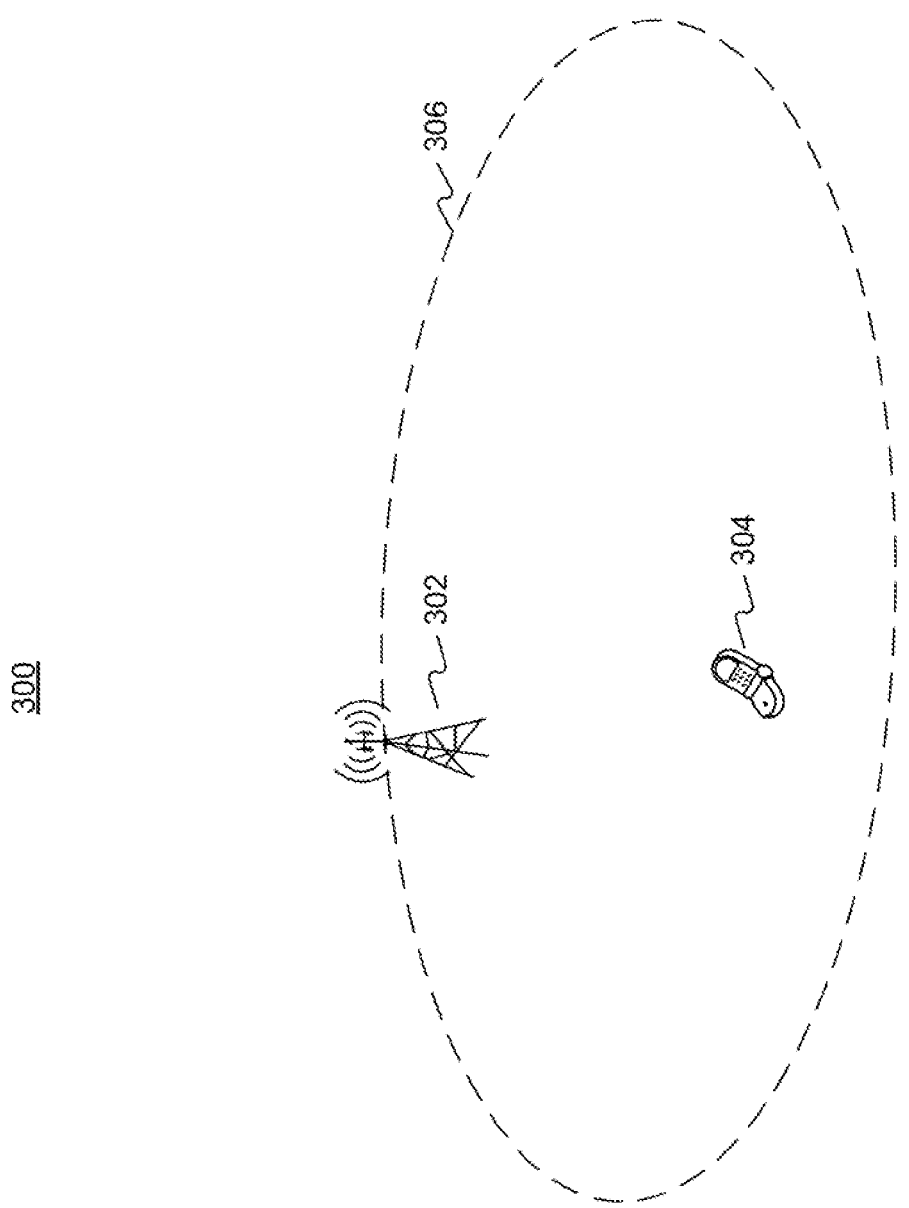
FIG. 3 illustrates a wireless communication system, according to an exemplary embodiment.

FIG. 3 illustrates a wireless communication system 300, according to an exemplary embodiment. The communication system 300 may operate in accordance with different standards, including, e.g., the IEEE 802.16 family of standards, the 3rd Generation Partnership Project (3GPP) standard, the High-Speed Packet Access (HSPA) standard, the Long Term Evolution (LTE) standard, etc.

In exemplary embodiments, the communication system 300 includes a base station 302 and one or more user terminals, such as a user terminal 304, located in a cell 306 covered by the base station 302. The user terminal 304 may be mobile, such as a mobile phone or a laptop, or may be immobile, such as a computer or a work station. The communication system 300 is configured to generate preamble signals, e.g., ranging preamble signals, using methods described below.

As described above, inter-carrier interference (ICI) of ranging preamble signals may degrade performance of a wireless communications system. In exemplary embodiments, different methods to generate ranging preamble signals may be used to reduce the ICI, as illustrated below in FIGS. 4-6.

Figure 4:
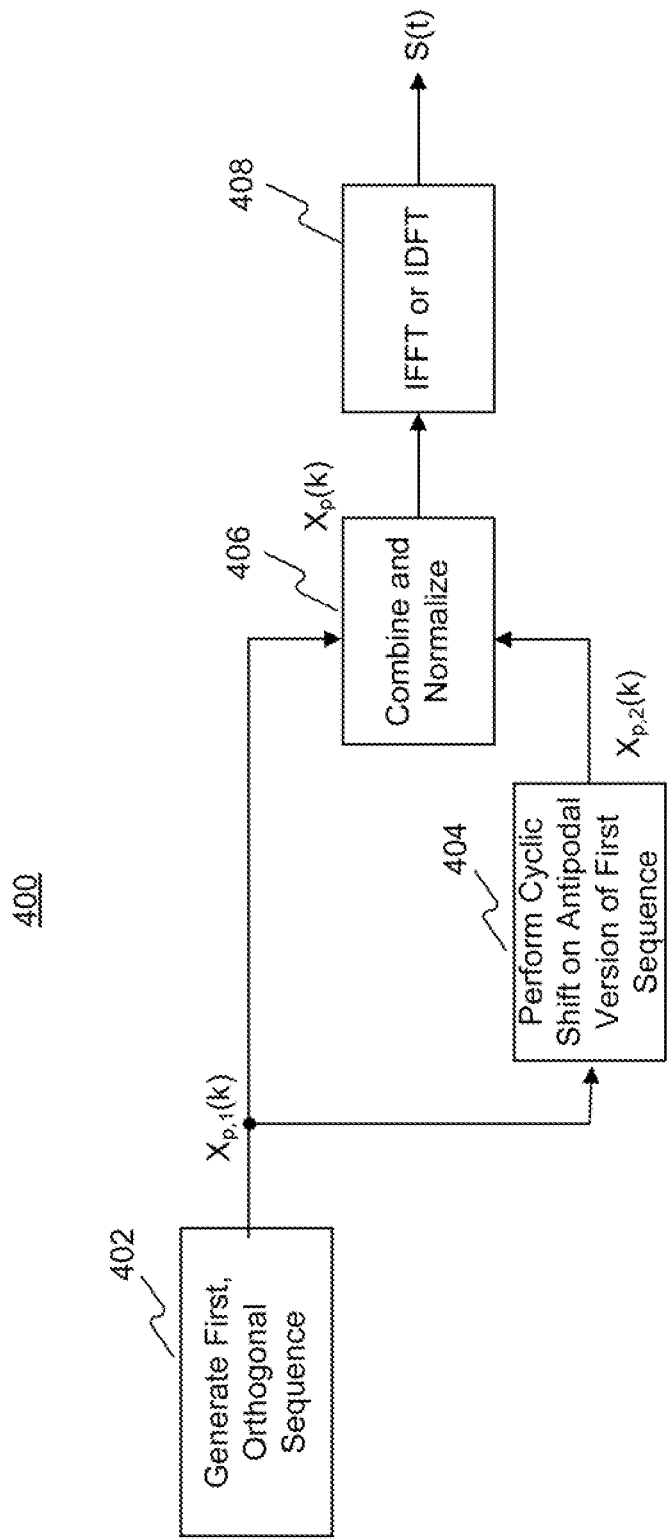
FIG. 4 illustrates a method for a user terminal to generate a ranging preamble signal, according to an exemplary embodiment.

FIG. 4 illustrates a method 400 for a user terminal, e.g., the user terminal 304 (FIG. 3), to generate a ranging preamble signal, according to an exemplary embodiment. Referring to FIGS. 3 and 4, the user terminal 304 generates a first, orthogonal sequence $x_{p,1}(k) = [x_p(0), x_p(1), \ldots, x_p(N-1)]$, such as the Zadoff-Chu sequence used in the IEEE 802.16m standard (402). The user terminal 304 further performs cyclic shift on an antipodal version of the first sequence $x_{p,1}(k)$, i.e., $[-x_p(0), -x_p(1), \ldots, -x_p(N-1)]$, to generate a second sequence $x_{p,2}(k)$ (404). For example, $x_{p,2}(k) = [-x_p(N-1), x_p(0), -x_p(1), -x_p(N-2)]$. The user terminal 304 then directly combines the first sequence $x_{p,1}(k)$ and the second sequence $x_{p,2}(k)$ in the frequency domain by adding each element in the first sequence $x_{p,1}(k)$ to a corresponding element in the second sequence $x_{p,2}(k)$, to generate a combined sequence $x_p(k)$ (406). For example, $x_p(k) = [x_p(0)-x_p(N-1), x_p(1)-x_p(0), \ldots, x_p(N-1)-x_p(N-2)]$. The user terminal 304 may also normalize the combined sequence $x_p(k)$. The user terminal 304 further performs an inverse fast Fourier transform (IFFT) or an inverse discrete Fourier transform (IDFT) on the combined sequence $x_p(k)$ to generate a preamble signal S(t) in the time domain (408).

Figure 5:
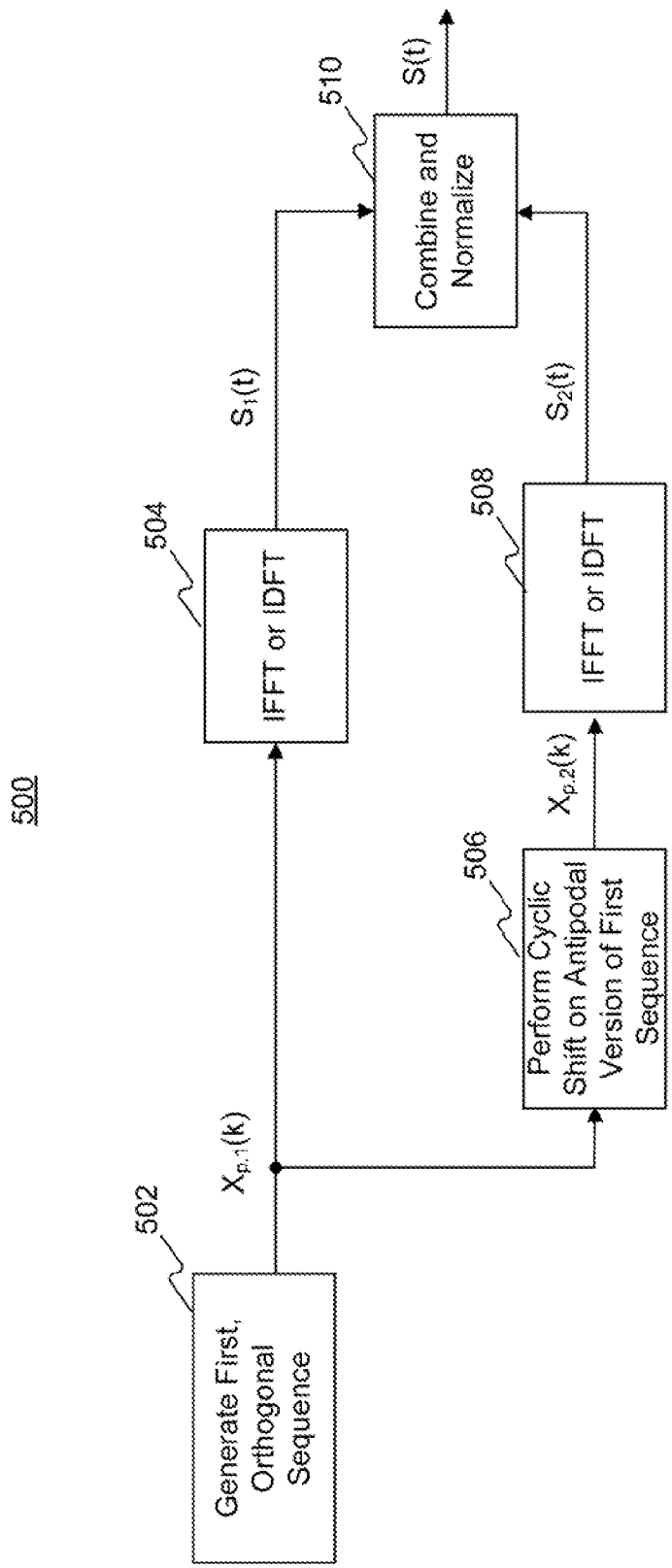
FIG. 5 illustrates a method for a user terminal to generate a ranging preamble signal, according to an exemplary embodiment.

FIG. 5 illustrates a method 500 for a user terminal, e.g., the user terminal 304 (FIG. 3), to generate a preamble signal, according to an exemplary embodiment. Referring to FIGS. 3 and 5, the user terminal 304 generates a first, orthogonal sequence $x_{p,1}(k)=[x_p(0), x_p(1), \ldots, x_p(N-1)]$, such as the Zadoff-Chu sequence used in the IEEE 802.16m standard (502), and performs the IFFT or the IDFT on the first sequence $x_{p,1}(k)$ to generate a first signal $S_1(t)$ (504). The user terminal 304 also performs cyclic shift on an antipodal version of the first sequence $x_{p,1}(k)$, i.e., $[-x_p(0), -x_p(1), \ldots, -x_p(N-1)]$, to generate a second sequence $x_{p,2}(k)$ (506). For example, $x_{p,2}(k)=[-x_p(N-1), -x_p(0), -x_p(1), \ldots, -x_p(N-2)]$. The user terminal 304 further performs the IFFT or the IDFT on the second sequence $x_{p,2}(k)$ to generate a second signal $S_2(t)$ (508). The user terminal 304 then combines the first signal $S_1(t)$ and the second signal $S_2(t)$ in the time domain, to generate a preamble signal S(t) (510). The user terminal 304 may additionally normalize the preamble signal S(t).

Figure 6:
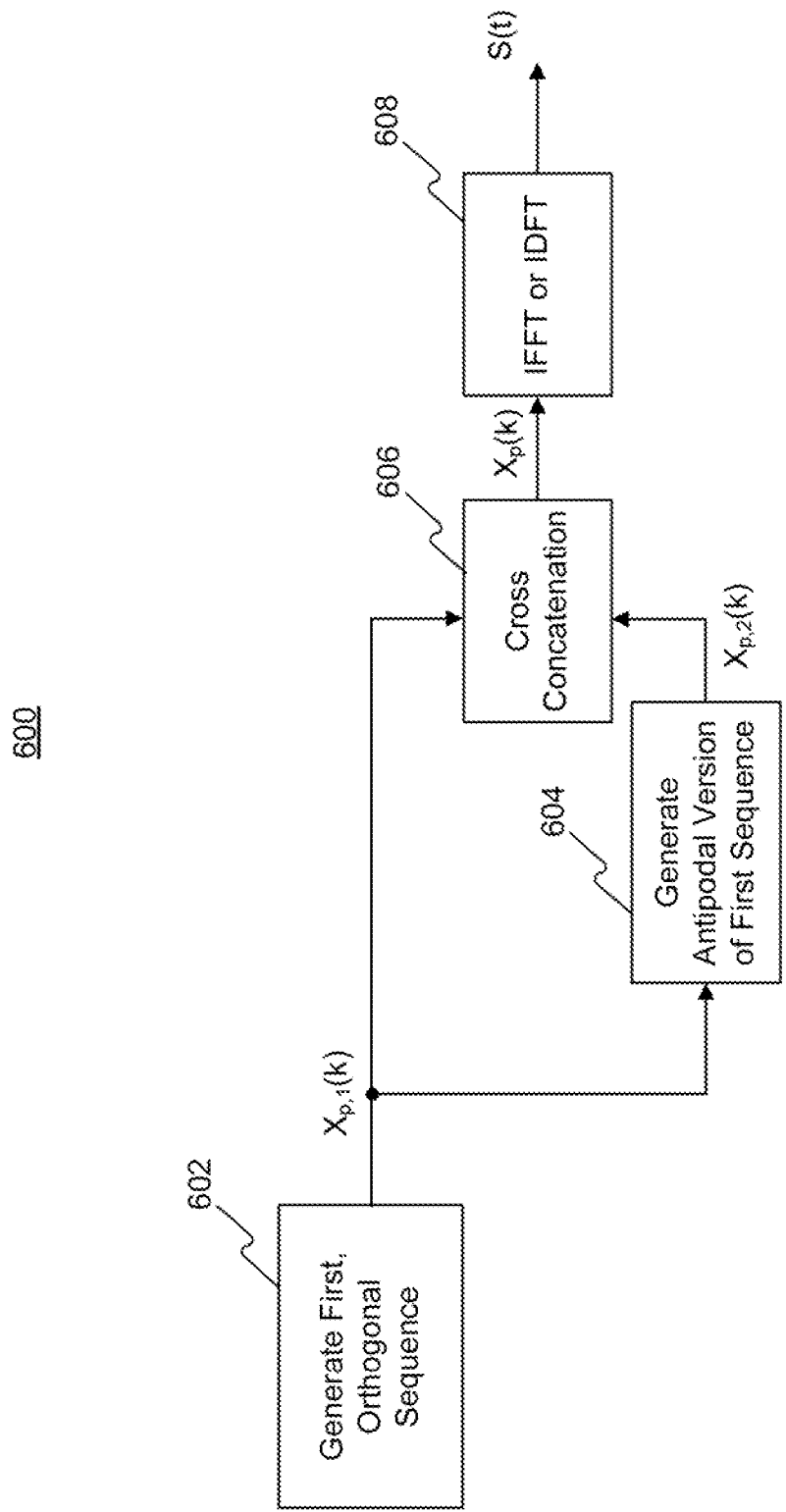
FIG. 6 illustrates a method for a user terminal to generate a ranging preamble signal, according to an exemplary embodiment.

FIG. 6 illustrates a method 600 for a user terminal, e.g., the user terminal 304 (FIG. 3), to generate a preamble signal, according to an exemplary embodiment. Referring to FIGS. 3 and 6, the user terminal 304 generates a first, orthogonal sequence $x_{p,1}(k)=[x_p(0), x_p(1), \ldots, x_p(M-1)]$, such as the Zadoff-Chu sequence used in the IEEE 802.16m standard (602), but a length of the first sequence, i.e., the value of M, may be approximately half of the length defined in the IEEE 802.16m standard. In one exemplary embodiment, the length of the first sequence is set to be equal to a prime number which is close to, but smaller than, $N_{RP}$ defined in equation (1). The user terminal 304 further generates an antipodal version of the first sequence $x_{p,1}(k)$, i.e., $[-x_p(0), -x_p(1), \ldots, -x_p(M-1)]$, as a second sequence $x_{p,2}(k)$ (604). The user terminal 304 then combines the first sequence $x_{p,1}(k)$ and the second sequence $x_{p,2}(k)$ in the frequency domain by performing cross concatenation of the first sequence $x_{p,1}(k)$ and the second sequence $x_{p,2}(k)$ (606), to generate a combined sequence $x_p(k)$. For example, $x_p(k)=[x_p(0), -x_p(0), x_p(1), -x_p(1), \ldots, x_p(M-1), -x_p(M-1)]$. The user terminal 304 then performs the IFFT or the IDFT on the combined sequence $x_p(k)$ to generate a preamble signal S(t) in the time domain (608).

As described above, a collision event may occur at a base station covering a large cell, when first and second user terminals in the cell select the same ranging preamble code (RPC) to generate ranging preamble signals. As a result, system performance may be degraded. In exemplary embodiments, a ranging preamble code division (RPCD) method may be used to improve system performance in a large cell during a ranging process.

Based on the RPCD method, the base station may provide first and second RPC sets. The second RPC set further includes first and second subsets, the first subset being for user terminals that each have an estimated signal round-trip delay (RTD) smaller than a predetermined RTD value, the second subset being for user terminals that each have an estimated signal RTD not smaller than the predetermined RTD value. Accordingly, the first subset is provided for user terminals located relatively close to the base station, and the second subset is provided for user terminals located relatively far away from the base station.

In exemplary embodiments, the base station may provide a plurality of orthogonal sequences as the first RPC set. The plurality of orthogonal sequences may be provided based on a communication standard. For example, based on the IEEE 802.16m standard, the base station may provide a plurality of Zadoff-Chu sequences as the first RPC set, by providing predetermined values of the parameters shown in equation (1). Those predetermined values include a plurality of predetermined values for the root parameter and a predetermined value $N_{original}$ for the cyclic shift parameter. In addition, each RPC in the first RPC set may include a plurality of subcodes when cyclic shift is applied, as shown in equation (1).

In exemplary embodiments, the base station may provide the second RPC set based on the first RPC set. For example, the base station may divide the predetermined values of the root parameter for the first RPC set into first and second groups. The base station may then provide the first subset of the second RPC set based on the first group of predetermined values of the root parameter and a predetermined value $N_{new}$, smaller than the value $N_{original}$, for the cyclic parameter, and provide the second subset of the second RPC set based on the second group of predetermined values of the root parameter and the value $N_{original}$ for the cyclic parameter. In addition, each RPC in the second RPC set may include a plurality of subcodes when cyclic shift is applied, as shown in equation (1).

Because the predetermined value $N_{new}$ is smaller than the predetermined value $N_{original}$, the second RPC set includes more RPCs than the first RPC set. Accordingly, collision events may occur at a lower frequency when the second RPC set is used than when the first RPC set is used.

In exemplary embodiments, the base station may divide the predetermined values of the root parameter for the first RPC set based on a total number of user terminals currently in the communication system, and a predetermined threshold $N_{sth}$. The threshold $N_{sth}$ represents a number of user terminals, predetermined based on historical statistics, that have been detected by the base station to have an estimated signal RTD smaller than the predetermined RTD value.

In exemplary embodiments, the base station may provide one or more additional RPC sets, similar to the above description in connection with the second RPC set. As a result, system performance may be further improved.

Figure 7A:
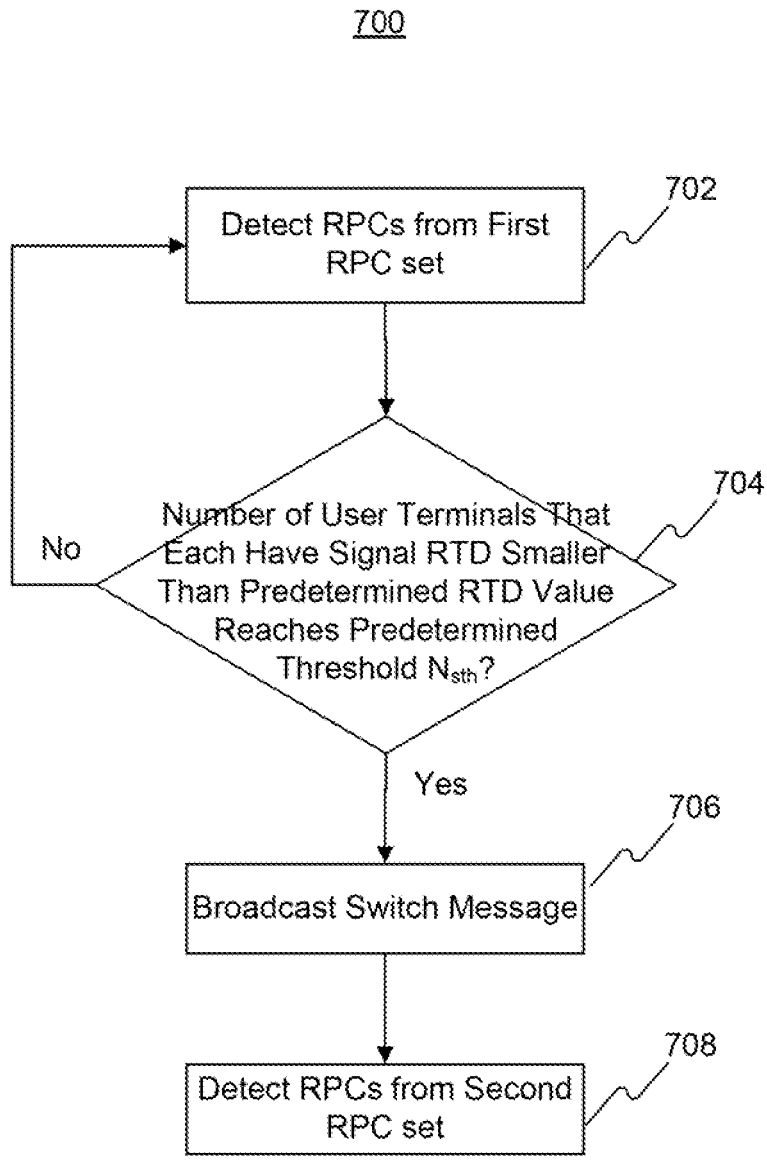
FIGS. 7A-7C illustrate flowcharts of a ranging preamble code division method performed in a wireless communication system, according to an exemplary embodiment.
Figure 7B:
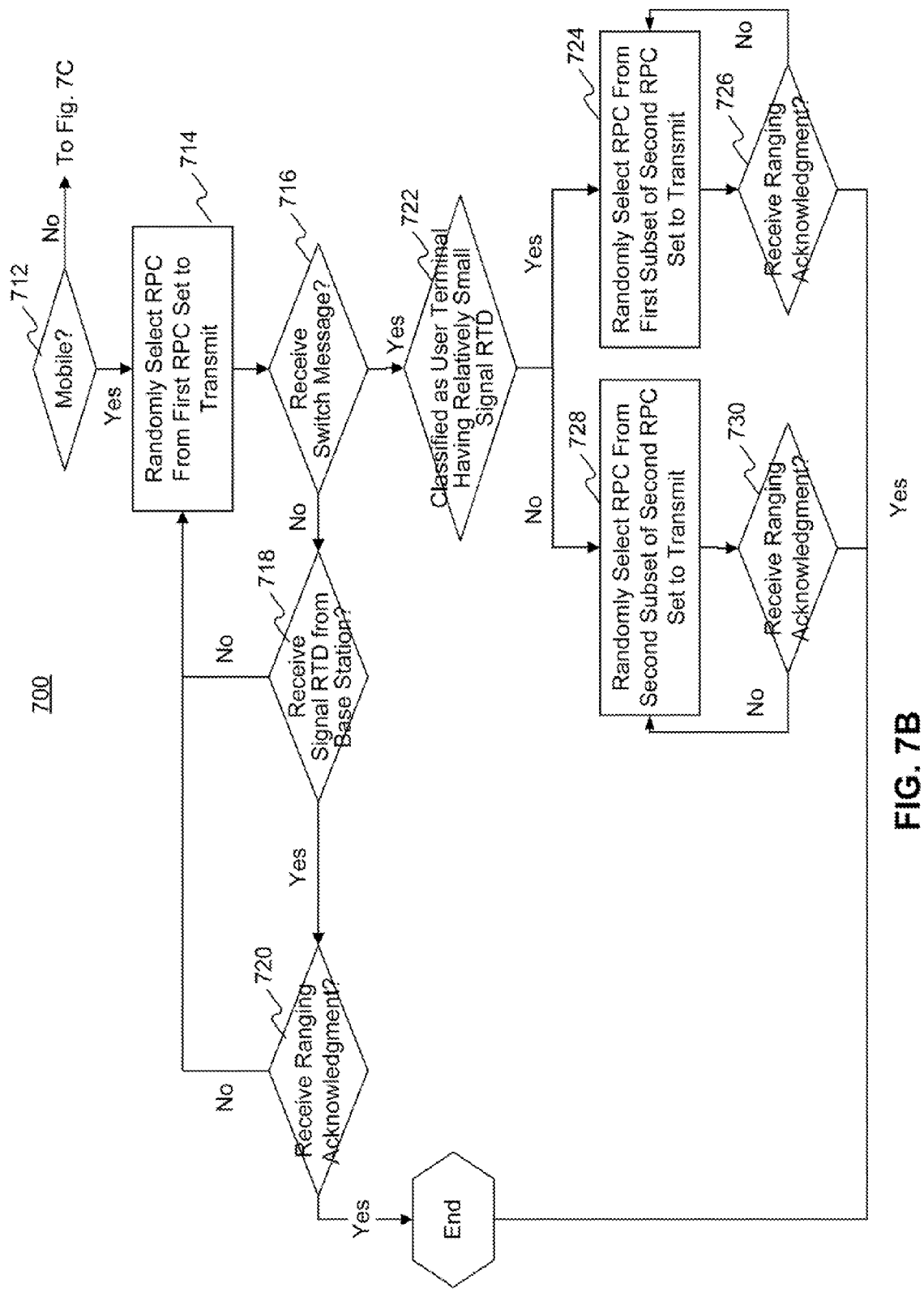
Figure 7C:
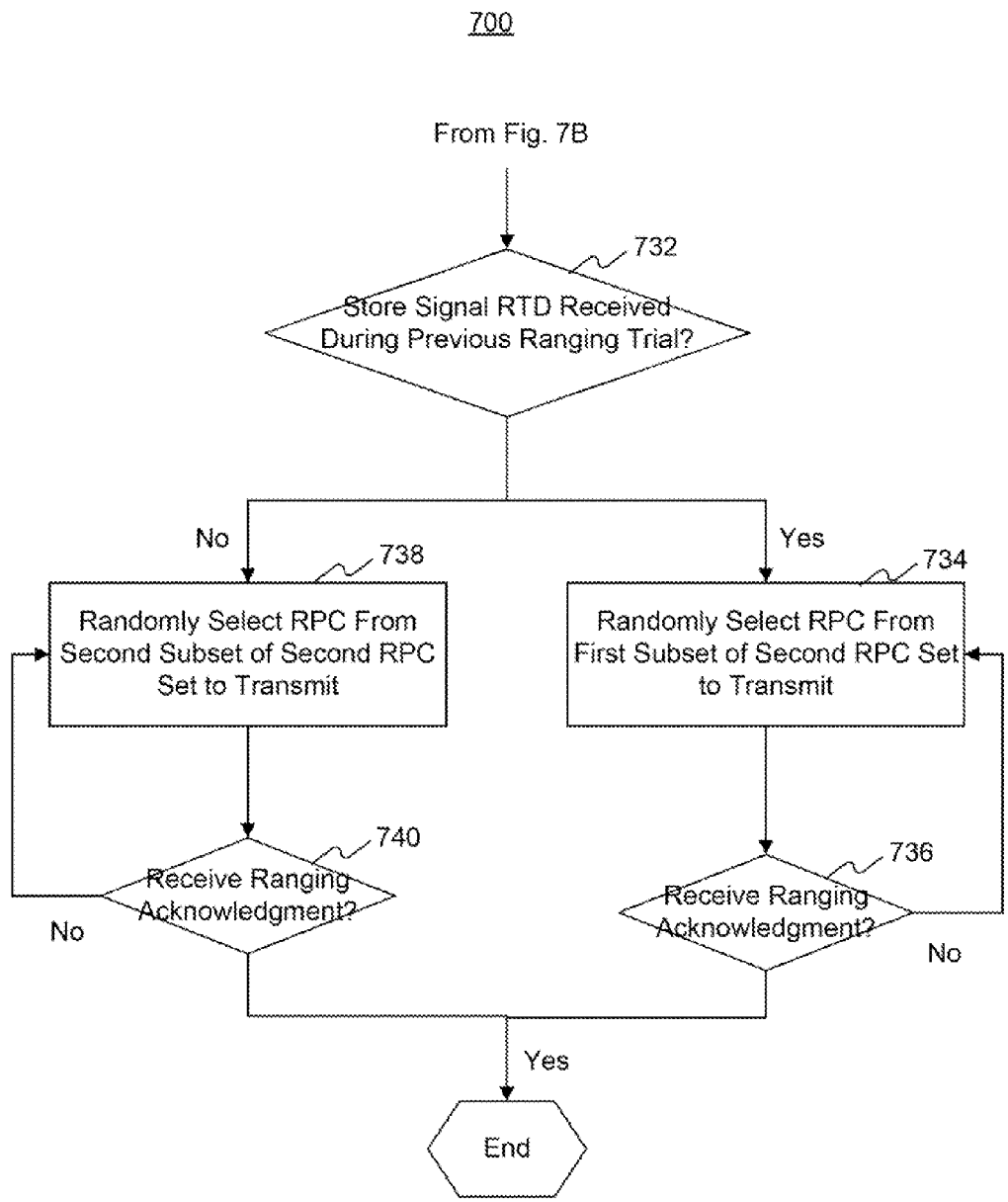

FIGS. 7A-7C illustrate flowcharts 700 of the RPCD method performed in a wireless communication system, e.g., the system 300 (FIG. 3), during a ranging process, according to an exemplary embodiment. Referring to FIGS. 3 and 7A, on the base station side, the base station 302 may broadcast the first and second RPC sets, and may initially use the first RPC set to perform ranging with all the user terminals in the cell 306. Accordingly, the base station 302 receives a plurality of ranging preamble signals and detects a plurality of RPCs transmitted from the user terminals, respectively, the detected RPCs being from the first RPC set (702). Based on the detected RPCs, the base station 302 may roughly estimate a signal RTD for each of the user terminals, and determines a number of the user terminals that each have an estimated signal RTD smaller than the predetermined RTD value. The base station 302 further determines if the number of the user terminals that each have an estimated signal RTD smaller than the predetermined RTD value reaches the predetermined threshold $N_{sth}$ (704). If the base station 302 determines that the number of the user terminals reaches the predetermined threshold $N_{sth}$ (704—Yes), the base station 302 uses the second RPC set to perform ranging with all the user terminals in the cell 306, by broadcasting a switch message informing the user terminals to switch to the second RPC set (706). Otherwise, step 702 is repeated.

Next, the base station 302 detects a plurality of RPCs transmitted from the user terminals in the cell 306, respectively, the detected RPCs being from the second RPC set (708). Based on the detected RPCs, the base station 302 may further estimate a signal RTD for each of the user terminals with improved accuracy. Accordingly, the base station 302 may estimate a timing offset between the base station 302 and each of the user terminals in the cell 306 with improved accuracy.

Referring to FIGS. 3 and 7B, on the user terminal side, for example, the user terminal 304 determines if it is mobile (712). If the user terminal 304 determines that it is mobile (712—Yes), the user terminal 304 randomly selects an RPC from the first RPC set provided by the base station 302 to generate a ranging preamble signal, and transmits the ranging preamble signal including the selected RPC to the base station 302 (714).

The user terminal 304 further determines if it receives a switch message from the base station 302 (716). If the user terminal 304 determines that it does not receive a switch message from the base station 302 (716—No), the user terminal 304 further determines if it receives an estimate of its signal RTD from the base station 302 (718). If the user terminal 304 determines that it receives an estimated signal RTD from the base station 302 (718—Yes), the user terminal 304 additionally determines if it receives from the base station 302 a ranging acknowledgement ACK indicating that the base station 302 has successfully estimated all communication parameters to be determined during the ranging process (720). If the user terminal 304 determines that it receives the ranging acknowledgement ACK (720—Yes), the ranging process ends. If the user terminal 304 determines that it does not receive the estimated signal RTD (718—No) or the ranging acknowledgement ACK (720—No), step 714 is repeated.

If the user terminal 304 determines that it receives a switch message from the base station 302 (716—Yes), the user terminal 304 further determines, based on the switch message, if it is classified by the base station 302 as a user terminal having a relatively small signal RTD, i.e., a user terminal having an estimated signal RTD smaller than the predetermined RTD value (722). If the user terminal 304 determines that it is classified as a user terminal having a relatively small signal RTD (722—Yes), the user terminal 304 randomly selects an RPC from the first subset of the second RPC set provided by the base station 302, which has the predetermined value $N_{new}$ for the cyclic shift parameter, to generate a ranging preamble signal, and transmits the ranging preamble signal including the selected RPC to the base station 302 (724). The user terminal 304 additionally determines if it receives from the base station 302 the ranging acknowledgement ACK (726). If the user terminal 304 determines that it receives the ranging acknowledgement ACK (726—Yes), the ranging process ends. Otherwise (726—No), step 724 is repeated.

If the user terminal 304 determines that it is not classified as a user terminal having a relatively small signal RTD (722—No), the user terminal 304 randomly selects an RPC from the second subset of the second RPC set provided by the base station 302, which has the predetermined value $N_{original}$ for the cyclic shift parameter, to generate a ranging preamble signal, and transmits the ranging preamble signal including the selected RPC to the base station 302 (728). The user terminal 304 additionally determines if it receives from the base station 302 the ranging acknowledgement ACK (730). If the user terminal 304 determines that it receives the ranging acknowledgement ACK (730—Yes), the ranging process ends. Otherwise (730—No), step 728 is repeated.

In exemplary embodiments, if the user terminal 304 determines that it is immobile (712—No), referring to FIGS. 3 and 7C, the user terminal 304 further determines if it stores in its memory device an estimated signal RTD received from the base station 302 during a previous ranging trial (732).

If the user terminal 304 determines that it stores in its memory device an estimated signal RTD received from the base station 302 during a previous ranging trial (732—Yes), the user terminal 304 randomly selects an RPC from the first subset of the second RPC set provided by the base station 302 to generate a ranging preamble signal, and transmits the ranging preamble signal including the selected RPC to the base station 302 (734). The user terminal 304 additionally determines if it receives from the base station 302 the ranging acknowledgement ACK (736). If the user terminal 304 determines that it receives the ranging acknowledgement ACK (736—Yes), the ranging process ends. Otherwise (736—No), step 734 is repeated.

If the user terminal 304 determines that it does not store in its memory device an estimated signal RTD received from the base station 302 during a previous ranging trial (732—No), the user terminal 304 randomly selects an RPC from the second subset of the second RPC set provided by the base station 302 to generate a ranging preamble signal, and transmits the ranging preamble signal including the selected RPC to the base station 302 (738). The user terminal 304 additionally determines if it receives from the base station 302 the ranging acknowledgement ACK (740). If the user terminal 304 determines that it receives the ranging acknowledgement ACK (740—Yes), the ranging process ends. Otherwise (740—No), step 738 is repeated.

In the above illustrated embodiment, it is assumed that the base station 302 provides the first and second RPC sets. However, it is understood that the base station 302 may provide additional RPC sets as noted above.

As described above, system performance may also be degraded during a ranging process due to Doppler effects. In exemplary embodiments, a ranging preamble code partition (RPCP) method may be used to improve system performance.

Based on the RPCP method, a base station provides an RPC set and partitions the RPC set into first and second groups, the first group being for user terminals that each have a power relating to Doppler effects larger than a predetermined threshold, and the second group being for user terminals that each have a power relating to Doppler effects not larger than the predetermined threshold. Accordingly, the first group is to be provided for user terminals that move at a relatively high speed, and the second group is to be provided for user terminals that move at a relatively low speed.

In exemplary embodiments, the base station may provide a plurality of orthogonal sequences as the RPC set. The plurality of orthogonal sequences may be provided based on a communication standard. For example, based on the IEEE 802.16m standard, the base station may provide a plurality of Zadoff-Chu sequences as the RPC set, by providing predetermined values of the parameters shown in equation (1). Those predetermined values include a plurality of predetermined values for the root parameter.

In exemplary embodiments, the base station partitions the predetermined values for the root parameter of the RPC set into first and second groups. For example, the base station may partition the predetermined values of the root parameter based on a ratio of a number of high speed user terminals to a total number of user terminals in the communication system determined based on historical statistics.

In exemplary embodiments, the base station further uses the first group of predetermined values for the root parameter to provide the first group of RPCs on which restricted cyclic shift is applied. When restricted cyclic shift is applied on an RPC, certain subcodes of the RPC, e.g., Subcodes 0 and 2 of Subcodes 0-3 of the RPC, may not be used. For example, the base station may apply restricted cyclic shift on the RPC by masking one or more cyclic shift positions of the RPC. The base station also uses the second group of predetermined values for the root parameter to provide the second group of RPCs on which non-restricted cyclic shift is applied. When non-restricted cyclic shift is applied on an RPC, all subcodes of the RPC, e.g., Subcodes 0-3 of the RPC, may be used.

Figure 8:
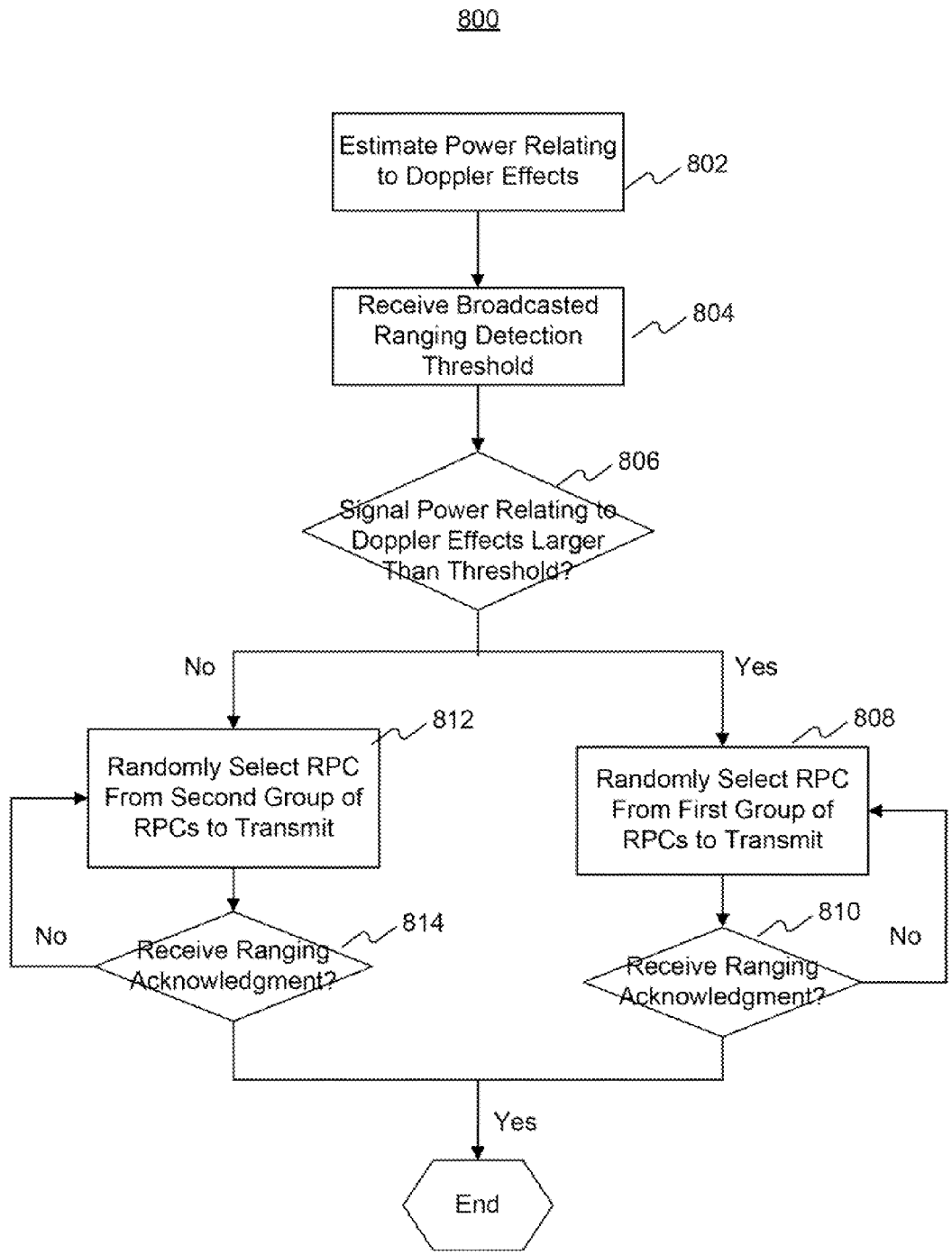
FIG. 8 illustrates a flowchart of a ranging preamble code partition method performed in a wireless communication system, according to an exemplary embodiment.

FIG. 8 illustrates a flowchart 800 of the RPCP method performed in a wireless communication system, e.g., the system 300 (FIG. 3), during a ranging process, according to an exemplary embodiment. Referring to FIGS. 3 and 8, on the base station side, the base station 302 broadcasts a message including the RPC set, which further includes the first group of RPCs on which restricted cyclic shift is applied and the second group of RPCs on which non-restricted cyclic shift is applied, and a predetermined ranging detection threshold.

On the user terminal side, the user terminal 304 estimates a signal power relating to Doppler effects by estimating a Doppler shift through downlink transmission from the base station 302 (802). The user terminal 304 also receives the predetermined ranging detection threshold (804). The user terminal 304 then determines if the signal power relating to Doppler effects is larger than the ranging detection threshold (806).

If the user terminal 304 determines that the signal power relating to Doppler effects is larger than the ranging detection threshold (806—Yes), which suggests that user terminal 304 is moving at a relatively high speed, the user terminal 304 randomly selects an RPC from the first group of RPCs on which restricted cyclic shift is applied, to generate a ranging preamble signal, and transmits the ranging preamble signal including the selected RPC to the base station 302 (808). The user terminal 304 additionally determines if it receives from the base station 302 a ranging acknowledgement ACK indicating that the base station 302 has successfully estimated all communication parameters to be determined during the ranging process (810). If the user terminal 304 determines that it receives the ranging acknowledgement ACK (810—Yes), the ranging process ends. Otherwise (810—No), step 808 is repeated.

If the user terminal 304 determines that the signal power relating to Doppler effects is not larger than the ranging detection threshold (806—No), which suggests that user terminal 304 is moving at a relatively low speed, the user terminal 304 randomly selects an RPC from the second group of RPCs on which non-restricted cyclic shift is applied, to generate a ranging preamble signal, and transmits the ranging preamble signal including the selected RPC to the base station 302 (812). The user terminal 304 additionally determines if it receives from the base station 302 the ranging acknowledgement ACK (814). If the user terminal 304 determines that it receives the ranging acknowledgement ACK (814—Yes), the ranging process ends. Otherwise (814—No), step 812 is repeated.

In exemplary embodiments, a spatial separation method may also be used to improve performance of a wireless communication system during a ranging process, when a base station in the system is configured to use a beamforming technique to detect ranging preamble codes transmitted on a first time/frequency resource, and to use a non-beamforming technique to detect ranging preamble codes transmitted on a second time/frequency resource.

Figure 9A:
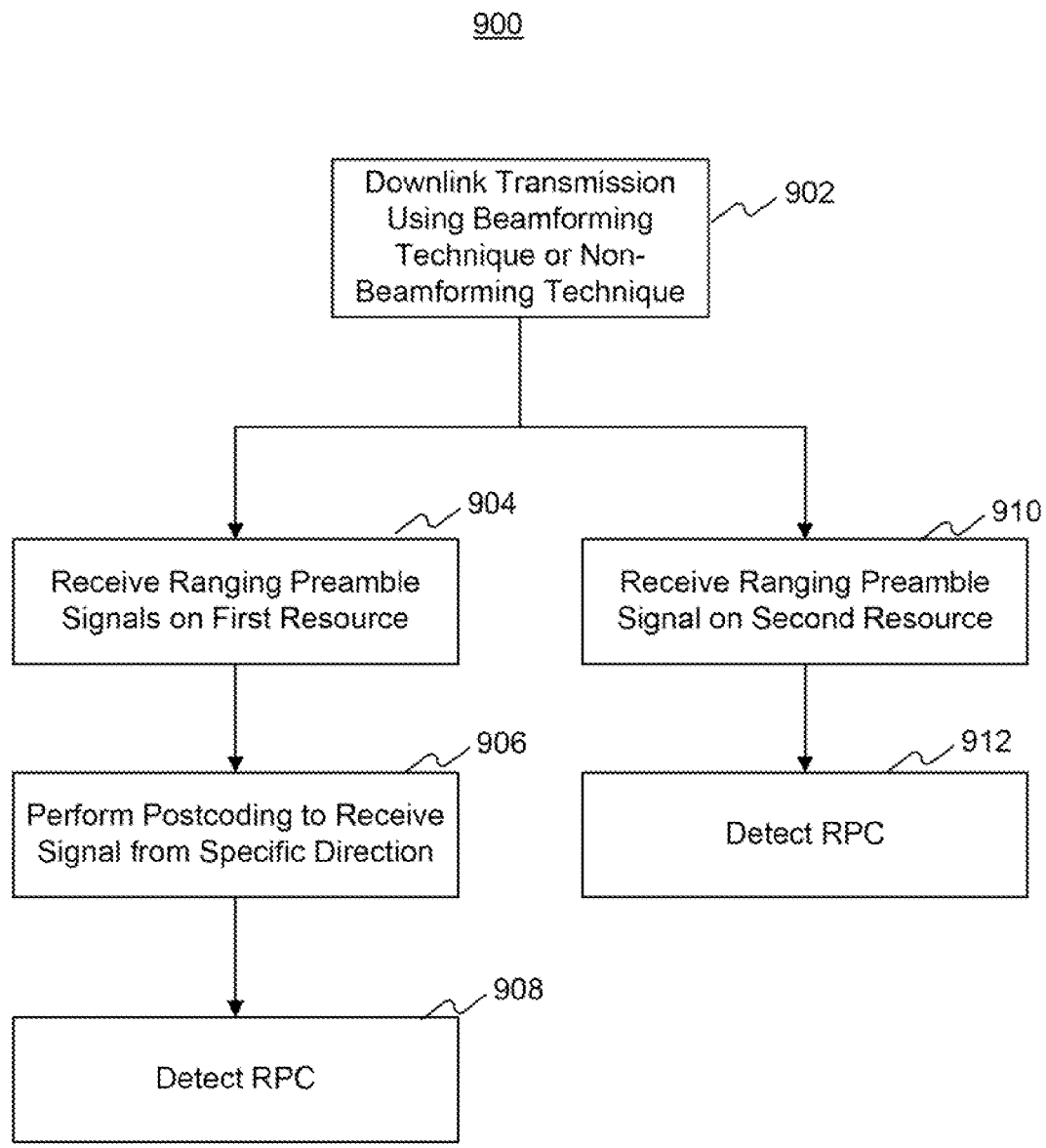
FIGS. 9A and 9B illustrate flowcharts of a spatial separation method performed in a wireless communication system, according to an exemplary embodiment.
Figure 9B:
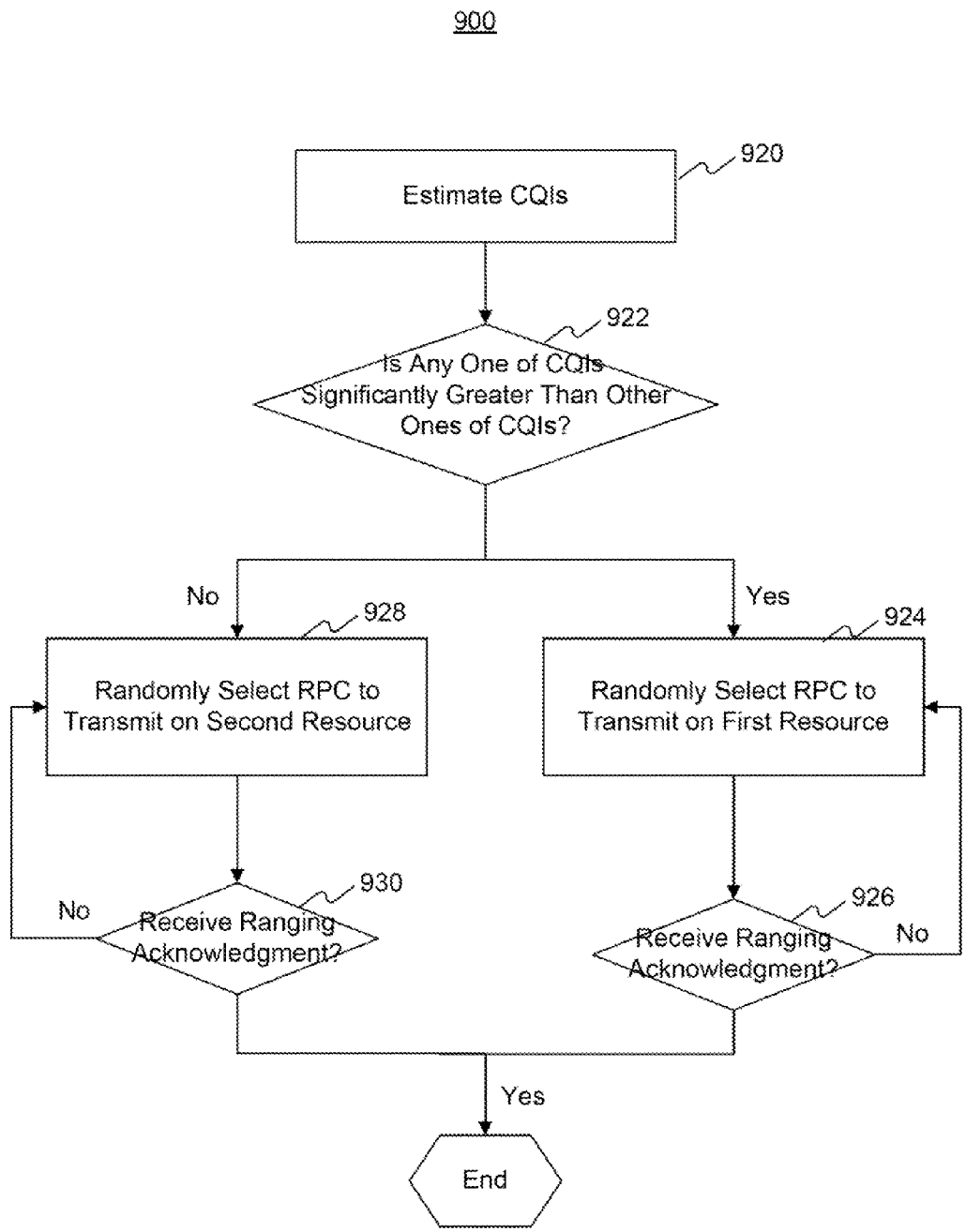

FIGS. 9A and 9B illustrate flowcharts 900 of the spatial separation method performed in a wireless communication system, e.g., the communication system 300 (FIG. 3), during a ranging process, according to an exemplary embodiment. Referring to FIGS. 3 and 9A, on the base station side, the base station 302 may provide an RPC set through downlink transmission using the beamforming technique or the non-beamforming technique (902). The base station 302 then checks if it receives from ranging preamble signals on the first resource or the second resource.

In one exemplary embodiment, the base station 302 receives ranging preamble signals on the first resource (904). The base station 302 further performs postcoding on the received signals in order to receive a ranging preamble signal from a specific direction (906). As a result, the base station 302 may detect an RPC included in the ranging preamble signal received from the specific direction (908).

In one exemplary embodiment, the base station 302 receives a ranging preamble signal on the second resource (910). As a result, the base station 302 may directly detect an RPC included in the received ranging preamble signal (912).

Referring to FIGS. 3 and 9B, on the user terminal side, the user terminal 304 estimates channel quality indicators (CQIs) based on preamble, midamble, or pilot signals in downlink transmission (920). For example, if the base station 302 uses the non-beamforming technique for downlink transmission, the user terminal 304 may estimate per-transmit-antenna CQIs. Also for example, if the base station 302 uses the beamforming technique for downlink transmission, the user terminal 304 may estimate per-transmit-path CQIs. The user terminal 304 further determines if any one of the CQIs is significantly greater than other ones of the CQIs (922).

If the user terminal 304 determines that one of the CQIs is significantly greater than other ones of the CQIs (922—Yes), the user terminal 304 randomly selects an RPC from the RPC set to generate a ranging preamble signal, and transmits on the first resource the ranging preamble signal including the selected RPC to the base station 302 (924). The user terminal 304 additionally determines if it receives from the base station 302 a ranging acknowledgement ACK indicating that the base station 302 has successfully estimated all communication parameters to be determined during the ranging process (926). If the user terminal 304 determines that it receives the ranging acknowledgement ACK (926—Yes), the ranging process ends. Otherwise (926—No), step 924 is repeated.

If the user terminal 304 determines that none of the CQIs is significantly greater than other ones of the CQIs (922—No), the user terminal 304 randomly selects an RPC from the RPC set to generate a ranging preamble signal, and transmits on the second resource the ranging preamble signal including the selected RPC to the base station 302 (928). The user terminal 304 additionally determines if it receives from the base station 302 the ranging acknowledgement ACK (930). If the user terminal 304 determines that it receives the ranging acknowledgement ACK (930—Yes), the ranging process ends. Otherwise (930—No), step 928 is repeated.

Figure 10:
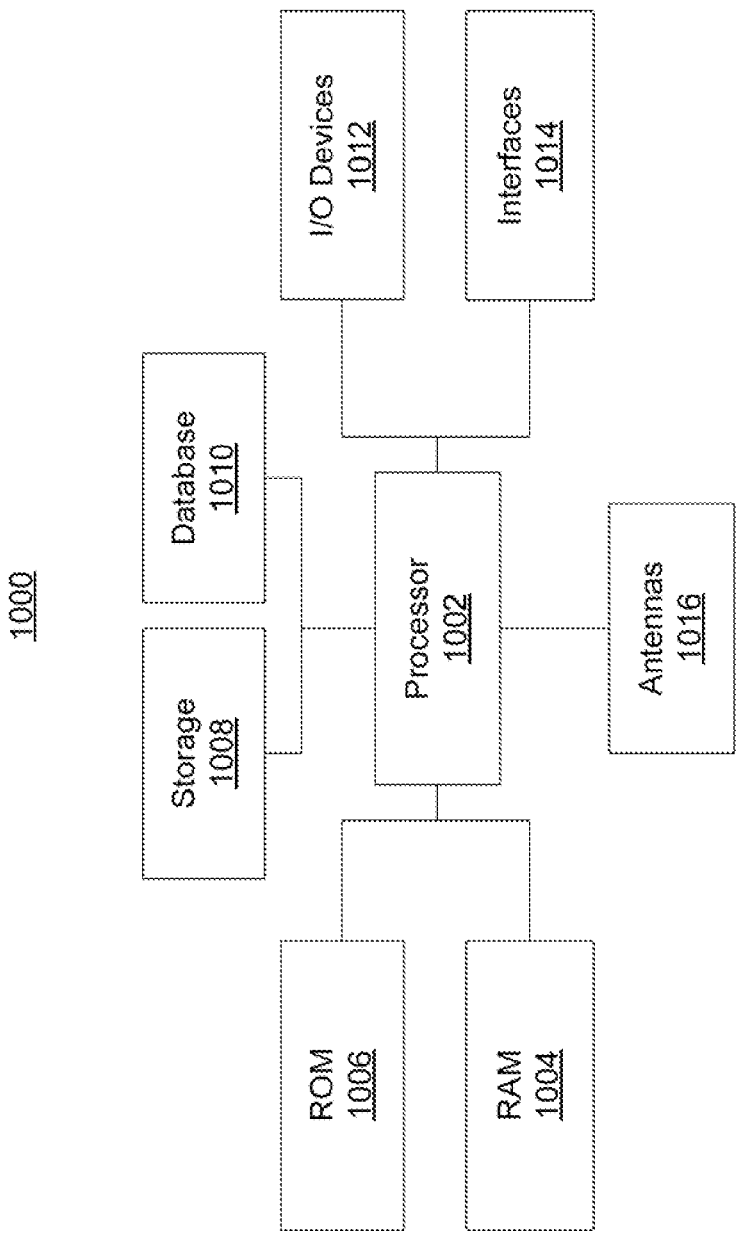
FIG. 10 illustrates a block diagram of a base station, according to an exemplary embodiment.

FIG. 10 illustrates a block diagram of a base station 1000, according to an exemplary embodiment. For example, the base station 1000 may be the base station 302 (FIG. 3). Referring to FIG. 10, the base station 1000 may include one or more of the following components: a processor 1002 configured to execute computer program instructions to perform various processes and methods, random access memory (RAM) 1004 and read only memory (ROM) 1006 configured to access and store information and computer program instructions, storage 1008 to store data and information, databases 1010 to store tables, lists, or other data structures, I/O devices 1012, interfaces 1014, antennas 1016, etc. Each of these components is well-known in the art and will not be discussed further.

Figure 11:
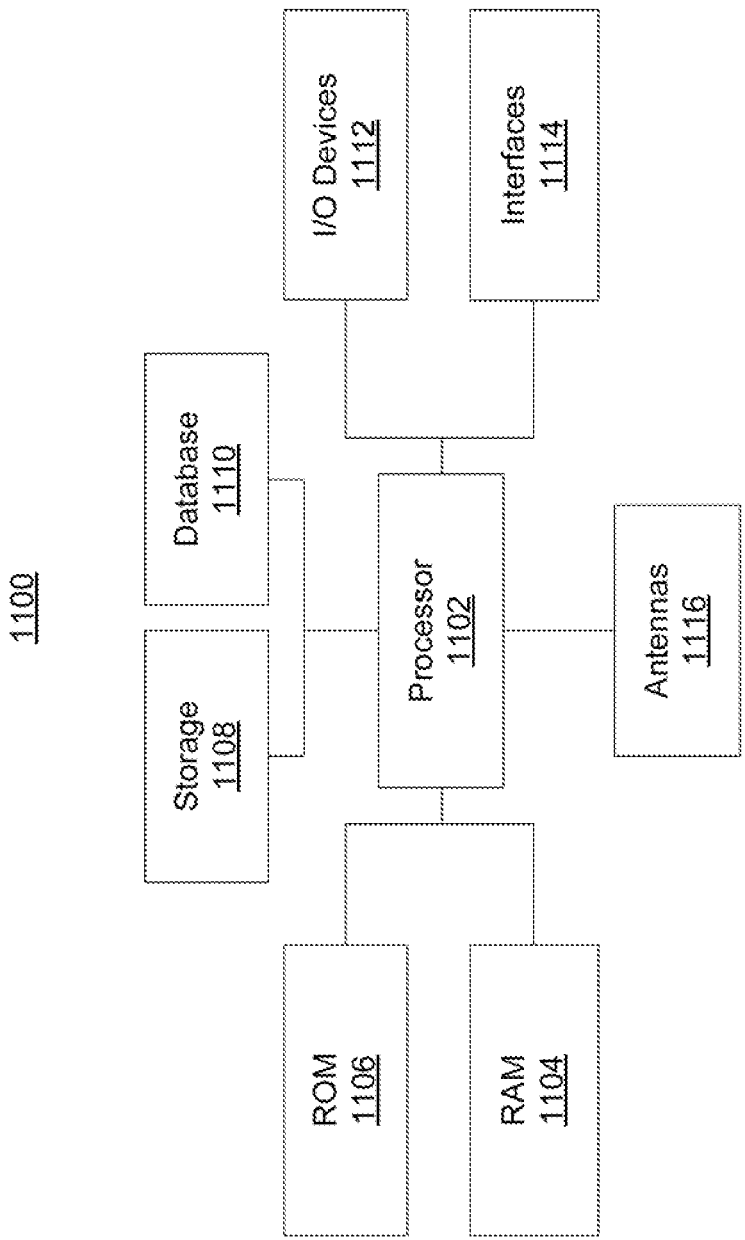
FIG. 11 illustrates a block diagram of a user terminal, according to an exemplary embodiment.

FIG. 11 illustrates a block diagram of a user terminal 1100, according to an exemplary embodiment. For example, the user terminal 1100 may be the user terminal 304 (FIG. 3). Referring to FIG. 11, the user terminal 1100 may include one or more of the following components: a processor 1102 configured to execute computer program instructions to perform various processes and methods, random access memory (RAM) 1104 and read only memory (ROM) 1106 configured to access and store information and computer program instructions, storage 1108 to store data and information, databases 1110 to store tables, lists, or other data structures, I/O devices 1112, interfaces 1114, antennas 1116, etc. Each of these components is well-known in the art and will not be discussed further.

Other embodiments of the invention will be apparent to those skilled in the art from consideration of the specification and practice of the invention disclosed herein. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a user terminal to transmit a ranging preamble code to a base station, the base station configured to use a beamforming technique to detect ranging preamble codes transmitted on a first resource, and to use a non-beamforming technique to detect ranging preamble codes transmitted on a second resource, the method comprising:
   estimating a plurality of channel quality indicators (CQIs);
   determining if any one of the CQIs is significantly greater than other ones of the CQIs;
   randomly selecting a ranging preamble code from a set of ranging preamble codes;
   transmitting, if it is determined that the one of the CQIs is significantly greater than the other ones of the CQIs, the selected ranging preamble code on the first resource; and
   transmitting, if it is determined that none of the CQIs is significantly greater than the other ones of the CQIs, the selected ranging preamble code on the second resource.

2. A user terminal to transmit a ranging preamble code to a base station, the base station configured to use a beamforming technique to detect ranging preamble codes transmitted on a first resource, and to use a non-beamforming technique to detect ranging preamble codes transmitted on a second resource, the user terminal comprising:
   a processor, the processor being configured to:
   estimate a plurality of channel quality indicators (CQIs);
   determine if any one of the CQIs is significantly greater than other ones of the CQIs;
   randomly select a ranging preamble code from a set of ranging preamble codes;
   transmit, if it is determined that the one of the CQIs is significantly greater than the other ones of the CQIs, the selected ranging preamble code on the first resource; and
   transmit, if it is determined that none of the CQIs is significantly greater than the other ones of the CQIs, the selected ranging preamble code on the second resource.

3. The user terminal of claim 2, further configured to operate according to the 3rd Generation Partnership Project (3GPP) standard or the Long Term Evolution (LTE) standard.

4. The user terminal of claim 2, further configured to operate according to a wireless communication standard.

* * * * *